(12) United States Patent
Kubo et al.

(10) Patent No.: US 7,687,186 B2
(45) Date of Patent: Mar. 30, 2010

(54) ENZYME ELECTRODE, AND SENSOR AND BIOFUEL CELL USING THE SAME

(75) Inventors: Wataru Kubo, Inagi (JP); Tsuyoshi Nomoto, Komae (JP); Tetsuya Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 520 days.

(21) Appl. No.: 11/534,959

(22) Filed: Sep. 25, 2006

(65) Prior Publication Data

US 2007/0122689 A1 May 31, 2007

(30) Foreign Application Priority Data

Sep. 30, 2005 (JP) .............................. 2005-289106

(51) Int. Cl.
*H01M 4/90* (2006.01)
(52) U.S. Cl. ..................... 429/43; 204/403.01; 429/44
(58) Field of Classification Search ................... 429/34, 429/43, 44; 204/403.01
See application file for complete search history.

(56) References Cited

U.S. PATENT DOCUMENTS

| 5,160,418 A | * | 11/1992 | Mullen | ................ 204/403.14 |
|---|---|---|---|---|
| 5,262,035 A | | 11/1993 | Gregg et al. | |
| 2005/0095466 A1 | * | 5/2005 | Minteer et al. | ................ 429/12 |
| 2007/0056852 A1 | | 3/2007 | Kubo et al. | |

FOREIGN PATENT DOCUMENTS

| JP | 62-115284 A | 5/1987 |
|---|---|---|
| WO | 2006/009324 A1 | 1/2006 |

OTHER PUBLICATIONS

Adam Heller, "Electrical Connection of Enzyme Redox Centers to Electrodes," 96 J. Phys. Chem. 3579-87 (1994).
Katsuhiko Kanaizuka et al., "Stepwise Preparation of Linear π-Conjugated Bis(terpyridine)metal Polymer Chains at Gold Surface" 34 Chem. Lett. 534-35 (2005).
Aaron I. Baba et al., "Influence of Bridging Ligand Unsaturation on Excited State Behavior in Mono- and Bimetallic Ruthenium(II) Diimine Complexes," 34 Inorg. Chem. 1198-1207 (1995).
Nakashima et al., "Sugar-Assisted Chirality Control of Tris(2,2'-bipyridine)-Metal Complexes," Chemistry Letters 1267-70 (1994).

* cited by examiner

*Primary Examiner*—Jane Rhee
(74) *Attorney, Agent, or Firm*—Fitzpatrick, Cella, Harper & Scinto

(57) ABSTRACT

The present invention relates to an enzyme electrode for transporting electric charge formed by an oxidation-reduction reaction in an enzyme to a conductive member at a high speed. Specifically, the enzyme electrode has a π-conjugated metal complex molecule immobilized on the conductive member and the enzyme immobilized on the conductive member through the π-conjugated metal complex molecule.

8 Claims, 2 Drawing Sheets

ENZYME ELECTRODE, AND SENSOR AND BIOFUEL CELL USING THE SAME

BACKGROUND OF THE INVENTION

1. Field of the Invention

The present invention relates to an enzyme electrode, and more particularly relates to an enzyme electrode having an enzyme immobilized on a conductive member through a π-conjugated metal complex molecule and an application field thereof.

2. Description of the Related Art

An enzyme, which is a protein biocatalyst made in a living cell, exhibits a stronger activity under milder conditions than does a normal catalyst. The enzyme also exhibits substrate specificity, and each enzyme generally catalyzes only a specific reaction of a specific substrate. Among enzymes, an enzyme referred to as an oxidoreductase catalyzes the oxidation-reduction reaction of a substrate. If an electric charge produced through the reaction due to the oxidoreductase could be provided to a conductive member, a highly selective electrode with a low overpotential can be produced by making use of this feature of the enzyme.

However, most oxidoreductases have a form in which the redox center is confined deep inside a three-dimensional structure of a protein. For this reason, the redox center is too far from the conductive member to effectively transfer electrons between it and the conductive member. As a result, it has been generally difficult to directly transport electrons between the active site of the oxidoreductase and the conductive member.

In order to enable the direct electron transfer, a technique has been widely used in which the enzyme is electrically connected to the conductive member with a material referred to as a mediator. For instance, Adam Heller J. Phys. Chem. 1992, 96, 3579 to 3587 describes a technique of delivering a mediator molecule into a protein of the enzyme and making the mediator molecule transfer electrons between itself and the redox center of the enzyme only after the mediator molecule is in close proximity to the redox center of the enzyme. After having transferred electrons between the mediator and the active site of the enzyme, namely, the redox center, the mediator transports the electric charge to the conductive member through diffusion and electron hopping. Thus, the electric charge of the enzyme reaction is delivered to the conductive member.

For the purpose of effectively using an enzyme and a mediator, and continuously using an electrode for a long period of time by preventing these components from leaking into the system, a technique of immobilizing them onto the electrode has been proposed. U.S. Pat. No. 5,262,035 discloses a technique of chemically or electrostatically immobilizing the enzyme and the mediator by using an enzyme carrier having the mediator in the molecule.

This technique shows a higher retaining ability of the electrode for the enzyme and the mediator and a greater effect of preventing them from leaking out of the system than a technique of physically adsorbing the enzyme.

Aside from these techniques, an enzyme electrode has been reported which uses an electroconductive polymer to immobilize the enzyme onto an electrode.

Japanese Patent Application Laid-Open No. 562-115284 discloses a technique of entrapping and immobilizing the enzyme in a polypyrrole film of an electroconductive polymer by electrolytically polymerizing pyrrole in a solution containing pyrrole and an oxidoreductase. According to this technique, an enzyme electrode can be prepared by immobilizing the enzyme in the polypyrrole of the electroconductive polymer without particularly needing a mediator.

SUMMARY OF THE INVENTION

U.S. Pat. No. 5,262,035 discloses a technique of chemically or electrostatically immobilizing the enzyme and the mediator by using an enzyme carrier having the mediator in the molecule. In this technique, an electric charge taken out from the enzyme into the metal center of a complex is transported to a substrate while electron-hopping the spaces between the complexes contained in carrier molecules.

The electron hopping process proceeds by the collision of metal complexes contained in a complex molecule in a carrier polymer caused by partial movement.

However, the electron hopping process does not show a high electric charge diffusion coefficient, and accordingly, may not provide an enzyme electrode with a large current because of being a rate-determining step in the whole enzyme electrode.

Japanese Patent Application Laid-Open No. 562-115284 discloses a technique of entrapping and immobilizing the enzyme in a polypyrrole film of an electroconductive polymer by electrolytically polymerizing pyrrole in a solution containing pyrrole and an oxidoreductase. According to this technique, an electric charge is transported to a substrate from a redox center of the enzyme, which has been entrapped and immobilized in a molecular chain of polypyrrole, through a polypyrrole molecule. The enzyme electrode prepared by the technique may decrease the activity of the enzyme because the enzyme is entrapped and immobilized in a rigid molecular polypyrrole chain, and may not provide a large current because the polypyrrole has low charge transportability.

An object of the present invention is to provide an enzyme electrode having high charge transportability from a redox center of an enzyme to a conductive member. Another object of the present invention is to provide a sensor and a biofuel cell with the use of such an enzyme electrode.

An enzyme electrode according to the first embodiment of the present invention comprises a conductive member and an enzyme, wherein the conductive member has a π-conjugated metal complex molecule immobilized thereon, and the enzyme is immobilized on the conductive member through the π-conjugated metal complex molecule.

A sensor according to the second embodiment of the present invention comprises the enzyme electrode and a reference electrode.

Furthermore, a fuel cell according to the third embodiment of the present invention has the features as described below. Specifically, the fuel cell has a region capable of holding an electrolytic solution arranged between an anode and a cathode, wherein at least one of the anode and the cathode is the enzyme electrode.

The present invention can provide an enzyme electrode, which has an increased electron transportation speed from an enzyme to a conductive member by immobilizing the enzyme onto the conductive member through π-conjugated metal complex molecules, and an increased catalytic current. The present invention can provide a sensor and a fuel cell having improved characteristics by using such an enzyme electrode.

Further features of the present invention will become apparent from the following description of exemplary embodiments with reference to the attached drawings.

BRIEF DESCRIPTION OF THE DRAWINGS

In FIG. 1, reference numeral 1 denotes a lead of a reference electrode, reference numeral 2 denotes a lead of a working electrode, reference numeral 3 denotes a lead of a counter electrode and reference numeral 4 denotes a potentiostat.

Furthermore, in FIG. 1, reference numeral 5 denotes a gas supply port, reference numeral 6 denotes a cover of a temperature control cell, reference numeral 7 denotes a gas supply pipe, reference numeral 8 denotes a temperature control cell and reference numeral 9 denotes a temperature-controlling water supply port. In addition, reference numeral 10 denotes a platinum counter electrode, reference numeral 11 denotes an anode, reference numeral 12 denotes an electrolytic solution, reference numeral 13 denotes a reference electrode, reference numeral 14 denotes a temperature-controlling water discharge port and reference numeral 15 denotes a cathode.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

DESCRIPTION OF THE EMBODIMENTS

In order to achieve the above described object, the present inventors have conducted extensive research, and as a result arrived at an idea of utilizing a π-conjugated metal complex molecule in order to transfer electrons from a redox center (also referred to as an active site) inside an enzyme to an electrode, which is a conductive member, at a high speed.

The π-conjugated metal complex molecule is a material actively studied in the field of molecular electronics in recent years. For instance, Katsuhiko Kanaizuka, Masaki Murata, Yoshihiko Nishimori, Ichiro Mori, Kazuyuki Nishio, Hideki Masuda, Hiroshi Nishihara Chem. Lett. 2005, 34, 534-535, discloses a π-conjugated metal complex molecule composed of a ligand and a metal center sequentially stacked on a substrate.

The present invention aims at transporting an electric charge from the redox center of an enzyme to a conductive member at a high speed by using a π-conjugated metal complex molecule and, at the same time, using the high charge-transport ability for immobilizing the enzyme to the conductive member.

It has been difficult to entrap and immobilize an enzyme in a π-conjugated metal complex molecule on the conductive member, because the π-conjugated metal complex molecules are systematically stacked on the conductive member in a standing direction from the substrate surface (namely, in a direction containing a vertical component to an in-plane direction of the substrate).

The present inventors have solved the problem by using a ligand capable of immobilizing an enzyme. Specifically, the present inventors have solved the above-described problem and accomplished the present invention by coordinating ligands capable of immobilizing the enzyme thereon to a metal center of the π-conjugated metal complex molecule and immobilizing the enzyme using the ligands.

A preferred embodiment of the present invention will be described in detail.

An enzyme electrode according to the present invention includes the use of a π-conjugated metal complex molecule immobilized on a conductive member. Here, the π-conjugated metal complex molecule is a complex molecule having a skeleton composed of a metal center of the complex and a π-conjugated ligand.

The π-conjugated metal complex molecule may be either a polynuclear complex containing a plurality of metal elements or a mononuclear complex containing one metal element. The metal elements contained in one π-conjugated metal complex molecule may be of one or several types. A metal element to be preferably used for composing the π-conjugated metal complex molecule is a transition metal element. The transition metal includes, for instance, Os, Fe, Ru, Co, Cu, Ni, V, Mo, Cr, Mn, Pt, Rh, Pd, and Ir.

A π-conjugated ligand to be preferably used for composing the π-conjugated metal complex molecule need only be a compound that has π-conjugation spread over the skeleton of the molecule and shows sufficient chemical stability and coordinating capability when an electrode is used in an aqueous solution.

The ligand site to be preferably used includes, for instance, bipyridine, terpyridine, phenanthroline, porphyrin, phthalocyanine and a derivative thereof, but especially includes a bipyridine derivative or a terpyridine derivative. In addition, in the case of a polynuclear complex, a site to be preferably used for connecting a plurality of ligand sites includes a π-conjugated molecule having such a structure as to show sufficient chemical stability and coordinating capability when the electrode is used in an aqueous solution. The structure includes, for instance, an acetylene bond, a benzene ring, a pyrrole ring, a thiophene ring, a pyridine ring, a diazo bond and a structure containing zero to five derivatives thereof.

A bipyridine derivative includes, for instance, 4,4'-dicarboxylic-2,2'-bipyridine (dCOOHbpy) and 1,4-bis(4-methyl-2,2'-bipyridin-4'-yl) benzene (bphb). The compound dCOOHbpy is commercially available from Tokyo Chemical Industry Co. Ltd., and the bphb can be synthesized by using a method by Baba et al. (Inorganic Chemistry 1995, 34, 1198-1207).

A technique for immobilizing a π-conjugated metal complex molecule on a conductive member is not particularly limited. Any immobilizing technique can be preferably used as long a chemical bond is formed between a conductive member and a π-conjugated metal complex molecule as showing sufficient chemical and electrochemical stability when the electrode is used in an aqueous solution. In addition, it is preferable that at least one of the π-conjugated ligands is a functional group that reliably bonds to the electrode. The functional group includes, for instance, a thiol group, a silicate group, a carboxyl group, a phosphate group, an amino group and a diazo group. It is also possible to use a combination of a plurality of different immobilization bonds for bonding the π-conjugated metal complex molecule to the conductive member so that one electrode can obtain objective characteristics.

The bond includes, for instance, a metal-thiol bond, a silicon-silicon bond, a carbon-carbon bond and a metal-phosphate bond.

In an enzyme electrode according to the present invention, an enzyme is immobilized in a ligand, which bonds to a metal in a π-conjugated metal complex molecule that is immobilized on a conductive member and is consequently immobilized on the conductive member.

The ligand capable of immobilizing the enzyme thereon is not particularly limited as long as it can be coordinated to the metal of the π-conjugated metal complex molecule and can immobilize the enzyme thereon.

The ligand to be preferably used includes, for instance, π-conjugated ligands containing a functional group capable of immobilizing the enzyme, and specifically a bipyridine derivative or a terpyridine derivative. The bipyridine derivative includes, for instance, 4,4'-diboronicacid-2,2'-bypyridine. The compound can be synthesized by using a method by Nakashima et al. (Chemistry Letters 1994, 1267). A technique for immobilizing the enzyme on the ligand is not particularly limited. Any bond between the enzyme and the ligand can be preferably used as long as it has sufficient chemical stability when the electrode is used in an aqueous solution. The example includes a method of bonding a thiol group to a composite of an enzyme and a metal particle and further bonding the ligand through the thiol group, and a method of chemically bonding a redox center of the enzyme to the ligand and then modifying the apoenzyme. Furthermore, the ligand may directly bond to the enzyme or may be introduced into the enzyme by a genetic engineering technique.

It is acceptable to employ a technique of sequentially stacking a component for preparing a π-conjugated metal complex molecule according to the present invention. The technique specifically consists of the following steps: bonding a π-conjugated ligand having a functional group capable of bonding to a conductive member onto the conductive member; subsequently coordinating metal ions thereon; further coordinating the π-conjugated ligand to a metal center; and finally bonding an enzyme to the ligand capable of bonding to the enzyme. The preparation method according to the present invention is different from an enzyme electrode introduced in Adam Heller J. Phys. Chem. 1992, 96, 3579 to 3587 also in a preparation process. In addition, the formation of the structure can be confirmed since as the stacked metal centers increase, the number of the metal centers involved in an oxidation-reduction reaction increases when the reaction is electrochemically measured, the weight of the layer increases when measured with a quartz crystal microbalance, and the thickness of the layer increases when measured with an electron microscope, though it can be measured when the layer exceeds a certain thickness. Furthermore, the immobilization of the enzyme is confirmed by observing whether the weight increases by the enzyme weight with a crystal resonator micro balance or by measuring a catalytic current passing through the enzyme electrode when a potential workable for the enzyme electrode is applied thereon in the presence of a corresponding substrate after it has been cleaned with a buffer solution.

An enzyme to be preferably used for an enzyme electrode is an oxidoreductase. The enzyme catalyzes an oxidation reduction reaction of a substrate.

It is acceptable to immobilize one enzyme or a plurality of different enzymes on an enzyme electrode in order to obtain objective characteristics. Furthermore, when using an enzyme that forms a composite of an enzyme and a metal particle, it is acceptable to conjugate one enzyme or a plurality of different enzymes with one metal particle.

A specific example of the enzyme includes glucose oxidase, bilirubin oxidase, laccase, pyruvate oxidase, cholesterol oxidase, lactate oxidase, ascorbate oxidase, cytochrome oxidase, alcohol dehydrogenase, cholesterol dehydrogenase, aldehyde dehydrogenase, formate dehydrogenase, glucose dehydrogenase, lactate dehydrogenase, diaphorase, catalase, peroxidase and thioredoxin reductase. It is also possible to simultaneously use an oxidoreductase and an enzyme, which is not the oxidoreductase. In this case, it is possible, for instance, to detect a product by an enzyme, which is not an oxidoreductase, with an oxidoreductase.

An enzyme electrode in one preferred aspect according to the present invention employs a composite of an enzyme and a metal particle as an enzyme, which is prepared by reacting an enzyme with a substrate in the presence of a metal precursor capable of forming a metal when the enzyme reacts with the substrate. The metal particle may consist of either a single particle of metal or plural particles thereof. It is verified that such a composite is formed by observing, for instance, an enzyme/gold particle composite with a transmission electron microscope.

A structure having one part of metal particles entrapped inside an enzyme can be obtained by reacting an enzyme with a substrate in the presence of a metal precursor, which can form a metal due to an interaction (enzyme reaction) of the enzyme with the substrate for the enzyme. When the enzyme is subjected to the enzyme reaction in the presence of the metal precursor, the substrate reacts in the enzyme containing an active site (active center) of the enzyme, and a metal is formed from the metal precursor along with the reaction. When these reactions proceed, the metal grows on an initiation point inside the enzyme, and in some cases, the metal in the enzyme coalesces with the metal formed outside the enzyme into a metal particle. Thus obtained metal particle has a shape such that one part of it is entrapped in the enzyme.

Here, a substrate to be used for an enzyme includes a compound that can form a metal from a metal precursor when it is chemically changed by an action of the enzyme. A preferred combination of the enzyme and the substrate includes the combination in which an electric charge is produced in a redox center of an oxidoreductase when the enzyme reacts with the substrate. Such a substrate for an enzyme includes not only a specific substrate for the enzyme (such as glucose to glucose oxidase and ethanol to alcohol dehydrogenase), but also natural and artificial compounds that the enzyme regards as substrates and causes the enzyme reaction.

In addition, a technique to be preferably used for forming a metal particle from a metal precursor consists of the steps of: preparing a solution containing an enzyme, a substrate for the enzyme and a metal precursor; conducting an enzyme reaction to produce the metal particle from the metal precursor; and simultaneously conjugating the metal particle with an enzyme into a composite. In other words, the composite of an enzyme and a metal particle is preferably prepared by reacting the enzyme with the substrate in the presence of the metal precursor that can form the metal while the enzyme reacts with the substrate.

In the above description, the metal particle includes a metal particle directly produced by the action of the enzyme on the substrate, but also includes a metal particle produced by the action of a product on a metal precursor, which has been produced through the action of an enzyme on a substrate.

A specific example includes a solution containing glucose oxidase, glucose and a chloraurate. In the solution, $FADH_2$ of a redox center in a glucose oxidase is produced by an oxidation reaction of glucose in the glucose oxidase and reduces chloroauric acid. Along with the reaction, chloroauric acid is reduced by hydrogen peroxide, which has been produced by the reaction of glucose with oxygen occurring in the glucose oxidase. An example of the previously described direct and subsidiary reaction can include such a reaction. However, the above description does not deny that an enzyme electrode according to the present invention includes an enzyme that is not conjugated with metal particles and metal particles that are not combined with the enzyme, in addition to the composite of an enzyme and a metal particle.

A material preferably having sufficient electrochemical stability when the electrode is used in an aqueous solution can be used as the metal in a composite of an enzyme and a metal particle. A combination of several different metals can also be used in order to impart electrode objective characteristics. The metal includes, for instance, Au, Pt, Ag, Co, Pd, Rh, Ni, Cr, Fe, Mo, Ti, Cu, W, and their alloys.

A metal precursor to be used for preparing a composite of an enzyme and a metal particle is preferably a compound that does not cause a rapid reaction in an aqueous solution and can moderately produce a metal particle. The metal precursor includes, for instance, a chloride, a citrate, a phosphate, a borate, a formate, an acetate, and a sulfite of a metal.

A usable metal particle of a composite of an enzyme and a metal particle is preferably a dispersion of primary particles, but may be a secondary particle of agglomerated primary particles. A particle size of the primary particle of the metal particle is preferably in a range of 2 to 50 nm, and more preferably is in a range of 2 to 20 nm. When the metal particles form the secondary particle, the particle size preferably does not exceed 200 nm, and more preferably does not exceed 50 nm. A lower limit of the size of the secondary particle is preferably 5 nm or larger.

A conductive member works in order to transport an electric charge formed in an enzyme reaction to an external circuit. A usable component of the conductive member is preferably a material having high electroconductivity and sufficient electrochemical stability under the conditions in which the electrode is used. A component for such a conductive member includes, for instance, a metal, an electroconductive polymer, a metal oxide and a carbon material. The metal includes, for instance, a material containing at least one of Au, Pt, Ag, Ni, Cr, Fe, Mo, Ti, Al, Cu, V, In, Ga, and W. The material may be an alloy or a material plated with the element. The electroconductive polymer includes a material containing at least one compound of, for instance, polyacetylene, polyarylene, polyarylenevinylene, polyacene, polyarylacetylene, polydiacetylene, polynaphthalene, polypyrrole, polyaniline, polythiophene, polythienylenevinylene, polyazulene, and polyisothianaphthene. The metal oxide includes a material containing at least one of, for instance, In, Sn, Zn, Ti, Al, Si, Zr, Nb, Mg, Ba, Mo, W, V, and Sr. The carbon material includes, for instance, graphite, carbon black, a carbon nanotube, a carbon nano-horn, a fullerene compound, and their derivatives.

A sensor according to the present invention includes the enzyme electrode according to the present invention as a sensor section for detecting a material. The sensor section is typically composed of an enzyme electrode as a working electrode, a counter electrode to be combined with the enzyme electrode, and a reference electrode as needed. Thus configured sensor section detects an electric current generated by a catalytic action of the enzyme immobilized on the electrode. It is capable of recognizing the substrate, and is used for qualitatively detecting a substance in a liquid with which these electrodes come into contact and measuring the concentration of the substance. The constitution of the sensor is not particularly limited as long as it can make the enzyme electrode detect an object. The sensor not only has high selectivity for a substrate originating in the enzyme, but also can expand a detectable concentration region, simplify a detection device and miniaturize a detecting part due to its high current density originating in the enzyme electrode having a composite of an enzyme and a metal particle formed thereon.

A biofuel cell according to the present invention includes the enzyme electrode according to the present invention as at least one of an anode and a cathode. The biofuel cell is typically composed of a reaction tank capable of storing an electrolytic solution containing a material to be fuel therein, and an anode and cathode which are placed so as to be electrically separated from each other in a reaction tank, and at least one of which is the enzyme electrode according to the present invention. The biofuel cell may be of a type in which the electrolytic solution is refilled, circulated, or neither refilled nor circulated. The type, structure and function of the fuel for the biofuel cell are not limited as long as the enzyme electrode can be used in the fuel. The biofuel cell can output high drive voltage because it can oxidize and/or reduce a substance at a low over-voltage due to high catalytic activity unique to the enzyme used as a catalyst for an electrode reaction, and output high current density originating in the enzyme electrode having a composite of an enzyme and a metal particle formed thereon. As a result, the biofuel cell can output high power density.

EXAMPLES

The present invention will be described in more detail with reference to Examples, but a method according to the present invention is not limited only to these Examples. In addition, an experiment was carried out at a room temperature (25° C.) in the following Examples unless otherwise designated. In advance of the Examples, Preparation Examples for a ligand to be used therein will be described.

Preparation Example 1

A method for synthesizing the ligand shown in the following Formula (1) will be now described.

1.5 M NaOH solution was added to an ethanol solution of equimolar 2-acetylpyridine and 4-emthylthiobenzaldehyde, followed by stirring at room temperature and filtering a product. The filtered product was washed with methanol and dried to obtain a white solid. 2-acetylpyridine and potassium-tert-butoxide were stirred in a nitrogen stream, followed by adding thereto the above-prepared white solid and continuing the stirring. Then, an excess of acetic ammonium and ethanol were added to the mixture, followed by refluxing the mixture. After cooling the resulting reaction solution, the solvent was removed by vacuum distillation. The residue was washed with water and methanol to obtain a pale yellow solid. The pale yellow solid and 10 mol equivalent of sodium ethanethiolate were added to a DMF solvent in a nitrogen atmosphere, and the mixture was refluxed. After removing the solvent by vacuum distillation, water was added to the system to remove water-soluble ingredients. Then, the resulting residue was solved into chloroform and reprecipitated repeatedly in methanol to obtain a compound of Formula (1).

Preparation Example 2

A method for synthesizing the ligand shown in the following Formula (2) will be now described.

4'-chloro-2',2":6',2"-terpyridene and 10 mol equivalent sodium ethanethiolate were added to a DMF solvent in a nitrogen atmosphere, followed by refluxing the mixture and removing the solvent by vacuum distillation. An aqueous solution of ammonium chloride was added to the resulting mixture, followed by stirring. The resulting solution was added to an aqueous solution of sodium hydroxide and the resulting white precipitate was recovered to obtain a compound of Formula (2).

Preparation Example 3

A method for synthesizing the ligand shown in the following Formula (3) will be now described.

Charge 1 equivalent of 4-aminobenzaldehyde, 2 equivalents of 2-acetylpyridine, ammonium acetate and acetamide, and reflux the mixture in the air atmosphere for three hours. Cool the reacted solution in air, add 50 g of aqueous sodium hydroxide solution to the cooled solution, and reflux the liquid. Cool the reacted solution in air and wash an oily solid with water. Dissolve the residue into a heated hydrobromic acid. Filter the produced umber precipitate, add it into 300 mL of water, and add sodium hydrogen carbonate to render it basic. Extract a product from the resulting solution with chloroform, pass the liquid through a column, and carry out the recrystallization to obtain 4'-(4-anilino)-2,2':6',2"-terpyridine.

Add 4'-(4-anilino)-2,2':6',2"-terpyridine and ammonium chloride to water as a solvent. Add thereto zinc powder while vigorously stirring it with a stirrer. Make the solutes react with each other for 20 minutes. Filter the reacted solution, pour the solution onto a large quantity of crushed ice, and add concentrated sulfuric acid into the solution. Add sodium bichromate to the above solution, stir the resultant, collect the produced precipitate, and wash it with water. Then, dry it to obtain 4'-(4-nitrosobenzene)-2,2':6',2"-terpyridine.

Add 4'-(4-nitrosobenzene)-2,2':6',2"-terpyridine to acetic acid. Add 4,4'-dithioaniline into the solution, and stir the liquid at room temperature. Add water and sodium carbonate to the liquid to neutralize the liquid, and extract the product with 150 mL of chloroform. Pass the extract through a column, evaporate the medium in the resulting solution under a reduced pressure, and dry it to obtain a ligand expressed by Formula (3).

Preparation Example 4

A method for synthesizing the ligand shown in the following Formula (4) will be now described.

Add 4'-(4-anilino)-2,2':6',2"-terpyridine into acetic acid. Add 4'-(4-nitrosobenzene)-2,2':6',2"-terpyridine to the solution and stir it at room temperature. Add water and sodium carbonate to neutralize the liquid, and extract the product from the resulting solution with chloroform. Pass the liquid through a column, which uses alumina as a filler, to obtain a ligand expressed by Formula (4).

Preparation Example 5

A method for synthesizing the ligand shown in the following Formula (3) will be now described.

Charge 4-(Dihydroxyboryl) benzaldehyde, 2-acetylpyridine, ammonium acetate and acetamide, and reflux the mixture. Cool the reacted solution in the air, add an aqueous solution of sodium hydroxide to the cooled solution, and reflux the liquid for two hours. Cool the reacted solution in air, wash the remaining oily solid with water.

Dissolve the residue into a heated hydrobromic acid. Filter the produced umber precipitate and add sodium hydrogen carbonate to neutralize it. Extract the resulting solid with chloroform, pass the liquid through a column, which uses silica as a filler, and carry out the recrystallization to obtain a ligand expressed by Formula (5).

Prior to discussing the Examples, Preparation Examples for a complex polymer to be used in the Examples will be described.

Preparation Example 6

A method for synthesizing the complex polymer shown in the following Formula (6) will be now described.

(6)

Azobis(isobutyronitrile) was added to 1-vinylimidazole, followed by stirring the mixture so as to subject it to a reaction at 50° C. in a nitrogen atmosphere under stirring, and reprecipitated in a methanol/acetone medium and dried to obtain poly-1-vinylimidazole.

The same equivalents of 2,2':6',2"-terpyridine and ammonium hexachloroosmate were added to ethyleneglycol solvent and refluxed in a nitrogen atmosphere. The reacted solution was air-cooled and then was added dropwise to diethyl ether. The produced precipitate was washed with water. The product was dried to obtain $Os(2,2':6',2''\text{-terpyridine})Cl_3$. Subsequently, $Os(2,2':6',2''\text{-terpyridine})Cl_3$ and 4,4'-dimethyl-2,2'-bipyridine were added to ethyleneglycol solvent and refluxed in a nitrogen atmosphere. The reacted solution was air-cooled and washed with diethyl ether. The product was dried to obtain $Os(2,2':6',2''\text{-terpyridine})(4,4'\text{-dimethyl-}2,2'\text{-bipyridine})Cl$. $Os(2,2':6',2''\text{-terpyridine})(4,4'\text{-dimethyl-}2,2'\text{-bipyridine})Cl$ and polyvinylimidazole were added to ethyleneglycol and refluxed in a nitrogen atmosphere. The reacted solution was air-cooled. The liquid was added dropwise to diethyl ether to form a viscous liquid. The resultant viscous liquid was then dried and passed through a Sephadex G25 column and dialyzed to obtain a complex polymer of Formula (6).

Prior to discussing the Examples, Preparation Examples for apo-glucose oxidase to be used in the Examples will be described.

Preparation Example 7

A method is described below for preparing apo-glucose oxidase, which is a glucose oxidase from which flavin adenine dinucleotide (FAD) of an redox center is eliminated. *Aspergillus niger* ($190\,\text{Umg}^{-1}$ made by Sigma) of the glucose oxidase (hereafter referred to as GOD) was dissolved in a phosphoric acid buffer solution. The resultant solution was cooled, and a sodium phosphate-sulfuric acid solution was added to this solution. The solution was left at 0° C. for 30 minutes and was passed through a gel column. The collected component was added to a mixture of dextran and activated carbon powder. A sodium hydroxide solution was added to the resulting system to neutralize it, followed by stirring and centrifuging, filtering, dialysis and freeze drying, to obtain apo-glucose oxidase.

Example 1

An enzyme electrode having GOD immobilized on a π-conjugated metal complex molecule, a glucose sensor and biofuel cell using it will be now described.

First, a method for preparing an anode will be described. A 0.1 M phosphate buffer solution, glucose in the amount of 50 mM, GOD in the amount of $10\,\text{mgmL}^{-1}$ and $NaAuCl_4$ in the amount of $8.0\,\text{mgmL}^{-4}$ were mixed with one another. The liquid was left for three days, and a GOD/gold particle composite was prepared.

Cleaned gold electrodes were immersed in chloroform solutions of ligands of Formulae (1) through (3), respectively. They were then cleaned with chloroform and dried with the stream of nitrogen gas. The dried gold electrodes were immersed in an aqueous solution of cobalt chloride, cleaned with water and dried. The resulting gold electrodes were immersed in a chloroform solution of 4', 4""-(1,4-phenylene) bis(2,2':6',2"-terpyridine) or the ligand shown in Formula (4), and then cleaned and dried. The resulting electrodes were then immersed in an aqueous solution of cobalt chloride, washed with water and dried. The resulting gold electrodes were immersed in chloroform solutions of the ligands shown in Formulae (1) through (3), respectively. They were then cleaned and dried. The resulting electrodes were immersed in a solution of the GOD/gold particle composite and cleaned with a phosphate buffer solution with the pH of 7.0 to obtain an anode (for this Example) was prepared.

Subsequently, a method for preparing a cathode will be described. A carbon mat (TORAYCA Mat made by Toray) was cut into a diameter of 3 mm, fixed on glassy carbon using a carbon paste, and treated with a UV ozonization technique. Laccase (*Coriolus hirsutus* made by SynectiQ Corporation) was added to a citrate buffer solution of an osmium polymer described in Preparation Example 6. The solution was stirred. An aqueous solution of poly(ethyleneglycol)diglycidylether was added to the stirred solution. The electrodes prepared in above were immersed in the solution for five minutes. The electrodes were dried to prepare the cathodes.

Next, a method for preparing a Comparative Example will be described. An aqueous solution of pyrrole and potassium chloride was provided to an electrolytic tank of a device. A potential of 1.0 V was applied to the device in which a silver/silver chloride electrode is used as a reference electrode, a platinum wire is used as a counter electrode, and the above described gold electrode is used as a working electrode. The prepared electrode was washed with a phosphate buffer solution to prepare an anode (for the Comparative Example).

Figure 1:
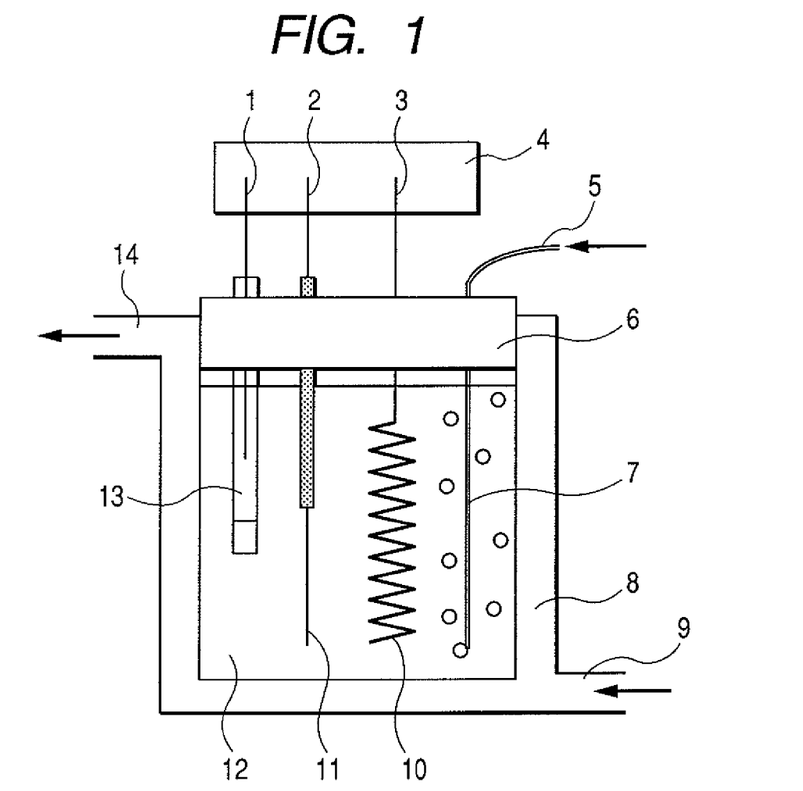
FIG. 1 is a schematic view of a three-electrode cell.

Next, a substrate sensor employing the prepared enzyme electrode will be described in detail. As is shown in FIG. 1, a substrate sensor composed of a three-electrode cell is prepared by using the prepared anode as a working electrode 11, a platinum wire as a counter electrode 10, and a silver/silver chloride electrode as a reference electrode 13, and is connected to a potentiostat 4. An electrolytic solution 12 was prepared by removing oxygen from a citrate buffer solution by blowing $N_2$ gas into the solution. The potential of 500 my vs. Ag/AgCl was applied to the working electrode and the steady state current (catalytic current) was observed. During the observation, the temperature in the cell was controlled by introducing water 1 into the cell 8. The same temperature-controlling method was adopted in a fuel cell shown in FIG. 3.

Generally, with regard to the dependence of the enzyme current on the substrate in an enzyme electrode, a region is observed in which the enzyme reaction is the rate-determining step and in which the current is not proportional to the substrate concentration. Further, it is a signal/noise ratio of the enzyme electrode that most seriously affects the lower limit of the concentration range in which it is possible to conduct the measurement in the enzyme electrode. The noise is proportional to the area of the conductive member. Accordingly, an effective way to decrease the noise is to design the conductive member that has a small area. Such a small area of the conductive member, however, also adversely decreases the signal.

In an enzyme electrode using a π-conjugated metal complex molecule, the immobilization of the enzymes on a conductive member in a manner of unifying orientations of the enzymes with the π-conjugated metal complex molecule makes it possible to increase the charge-transferring rate from the active center of the enzyme to the conductive member compared to that when the enzymes are immobilized in any random direction as in the Comparative Example. The immobilization in this manner increases the concentration of the substrate, in which the reaction of an enzyme is the rate-determining step, whereby the upper limit of a concentration range in which it is possible to conduct the measurement in the enzyme electrode can be improved. The immobilization in this manner also improves the enzyme current density (i.e., current per unit area of the conductive member) of the enzyme electrode, which enables a smaller area of the conductive member to provide the same enzyme current, and therefore, makes it possible to improve the signal/noise ratio and decrease the lower limit of the concentration range.

Figure 2:
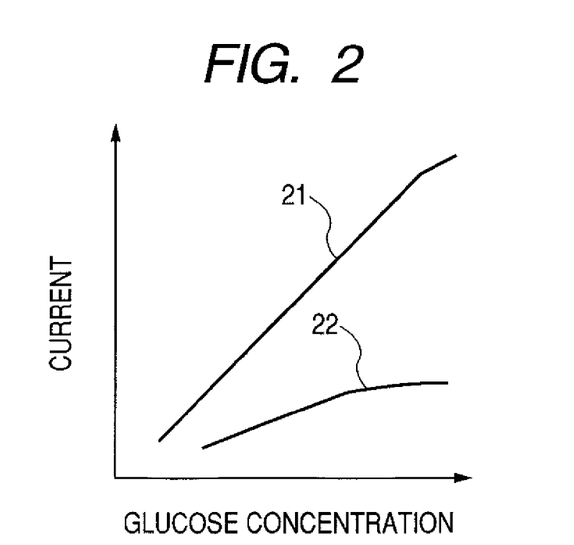
FIG. 2 is a diagrammatic drawing showing a relationship between a steady state current and a substrate concentration in substrate sensors of Example 1 and the Comparative Example.

A steady state current passing through an anode of Example 1 or an anode of the Comparative Example was examined for glucose solutions with varying concentrations. The dependency of the steady state current on the glucose concentration is shown in FIG. 2. The steady state current observed on the anode in Example 1 (plotted line 21) is greater than in the Comparative Example (plotted line 22). This difference increases as the glucose concentration increases. Further, each electrode has a tendency to show a steady state current that linearly increases until it reaches a certain concentration and then gradually becomes constant. In Example 1, the linearity exists in a concentration range from a lower to a higher value than in the Comparative Example.

Figure 3:
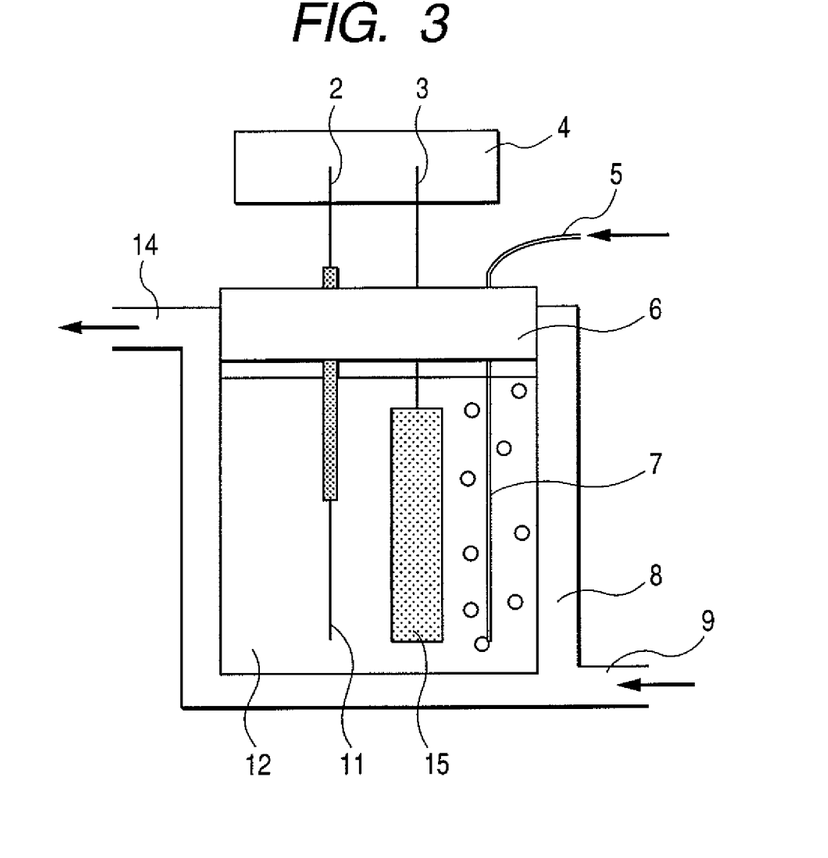
FIG. 3 is a schematic view of a two-electrode cell.

Next, a biofuel cell with the prepared anode and a cathode will be described in detail. With respect to the dependency of the enzyme current on the substrate in the enzyme electrodes, the same as in the above sensor, a region is observed in which the enzyme reaction is the rate-determining step and in which the current is not proportional to the substrate concentration. As is shown in FIG. 3, a biofuel cell was prepared by using the prepared anode as a working electrode 11 and a cathode as a counter electrode 15. The characteristics of the biofuel cell were measured in the state that the biofuel cell used a 0.2 M citrate buffer solution with the pH of 5.0 containing 20 mM of glucose as an electrolytic solution 12 and blew air into the solution. The observed maximum output at the anode has a tendency to be greater in Example 1 than in the Comparative Example for the above reason.

Example 2

An enzyme electrode having glucose oxidase immobilized on a π-conjugated metal complex molecule, and a glucose sensor and biofuel cell using it, will be now described.

Cleaned gold electrodes were immersed in chloroform solutions of the ligands shown in Formulae (1) through (3), respectively. They were then cleaned with chloroform and dried with the stream of nitrogen gas. The gold electrodes were immersed in an aqueous buffer solution of cobalt chloride, washed with water and dried. Then, the gold electrodes were immersed in a chloroform solution of a complex ligand of formula (5), cleaned and dried. The resulting electrodes were immersed in a methanol/water solution of chlorine hydroxide in which FAD was dissolved, followed by immersing them in phosphate buffer solution of apo-glucose and washing to prepare an anode.

A substrate sensor using the prepared enzyme electrode is described below in detail. As is shown in FIG. 1, a substrate sensor composed of a three-electrode cell was prepared by using the prepared anode as a working electrode 11, a platinum wire as a counter electrode 10 and a silver/silver chloride electrode as a reference electrode 13, and was connected to a potentiostat. An electrolytic solution was prepared by removing oxygen from a 0.2 M citrate buffer solution with the pH of 5.0 by blowing $N_2$ gas into the solution for 30 minutes or longer. The potential of 500 my vs. Ag/AgCl was applied to the working electrode and the steady state current (catalytic current) was observed. The same sample as is used in Example 1 was employed for the Comparative Example.

In the same manner as in Example 1, in an enzyme electrode using a π-conjugated metal complex molecule, the immobilization of the enzymes on a conductive member in a manner of unifying orientations of the enzymes with the π-conjugated metal complex molecule makes it possible to increase the charge-transferring rate from the active center of the enzyme to the conductive member, whereby the upper limit of a range of concentration in which it is possible to conduct the measurement in the enzyme electrode can be improved. The immobilization in this manner also improves the enzyme current density (i.e., the current value per unit area of the conductive member) of the enzyme electrode, which enables a smaller area of the conductive member to provide the same enzyme current, and therefore, makes it possible to improve the signal/noise ratio and decrease the lower limit of the range of concentration.

Figure 4:
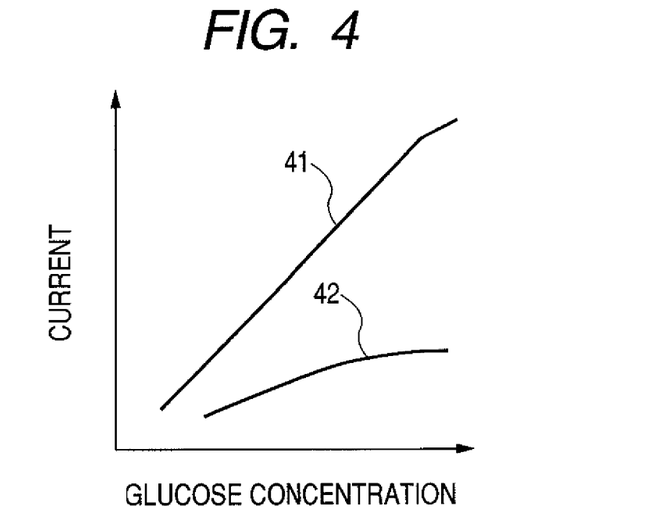
FIG. 4 is a diagrammatic drawing showing a relationship between a steady state current and a substrate concentration in substrate sensors of Example 2 and the Comparative Example.

The dependency of the steady state current observed on the glucose concentration in the solution is shown in FIG. 4. The value of steady state current observed on each anode is greater in Example 2 (plotted line 41 in FIG. 4) and smaller in the Comparative Example (plotted line 42 in FIG. 4). The difference therebetween increases with the increase of the glucose concentration. The difference increases as the glucose concentration increases. Further, each electrode has a tendency to show a steady state current, which linearly increases until it reaches a certain value of the concentration, and then gradually becomes constant. In Example 2, the linearity exists in a concentration range starting from a lower value and ending at a higher value than in the Comparative Example.

Next, a biofuel cell using the prepared anode and a cathode is described in detail. As is shown in FIG. 3, a biofuel cell was prepared by using the prepared anode as a working electrode and a cathode as a counter electrode. The characteristics of the biofuel cell were measured when the biofuel cell used a 0.2 M citrate buffer solution with the pH of 5.0 containing 20 mM of glucose as an electrolytic solution 12 and blew the air into the solution. An anode employed in Example 1 was used for the Comparative Example. In Example 2, it is also possible to increase the charge-transferring rate from the active center of the enzyme to the conductive member, whereby the output of the cell can be improved.

The present invention can provide a new enzyme electrode, and a sensor and biofuel cell using it. The enzyme electrode is very useful for a member usable in, for instance, the biosensor and the fuel cell using a substrate for an enzyme as fuel.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-289106, filed Sep. 30, 2005, which is hereby incorporated by reference herein in its entirety.

What is claimed is:

1. An enzyme electrode comprising a conductive member and an enzyme, wherein
the conductive member has a π-conjugated metal complex molecule immobilized thereon, and
the enzyme is immobilized on the conductive member through the π-conjugated metal complex molecule,
wherein the π-conjugated metal complex molecule is a polynuclear complex molecule.

2. The enzyme electrode according to claim 1, wherein the enzyme is immobilized on a ligand bonded to a metal center of the π-conjugated metal complex molecule.

3. The enzyme electrode according to claim 1, wherein the π-conjugated metal complex molecule has a metal center which is a transition metal element.

4. The enzyme electrode according to claim 1, wherein the π-conjugated metal complex molecule has a bipyridine derivative or a terpyridine derivative as ligand.

5. The enzyme electrode according to claim 1, wherein the enzyme comprises a metal particle and is in the form of a composite of the enzyme and the metal particle, the metal particle being formed by reacting the enzyme with a substrate for the enzyme in the presence of a metal precursor capable of forming a metal during the reaction of the enzyme with the substrate for the enzyme.

6. The enzyme electrode according to claim 5, wherein the enzyme has at least a part of the metal particle entrapped therein and is in the form of a composite with the metal particle.

7. A sensor comprising the enzyme electrode according to claim 1 and a counter electrode.

8. A fuel cell having a region capable of holding an electrolytic solution arranged between an anode and a cathode, wherein at least one of the anode and the cathode is the enzyme electrode according to claim 1.

* * * * *